Oct. 22, 1946.  K. L. HULSING  2,409,761

SLEEVE VALVE ENGINE

Filed Feb. 24, 1945  2 Sheets-Sheet 1

Inventor
Kenneth L. Hulsing
By Blackmore, Spencer & Hunt
Attorneys

Oct. 22, 1946.   K. L. HULSING   2,409,761
SLEEVE VALVE ENGINE
Filed Feb. 24, 1945   2 Sheets-Sheet 2

Inventor
Kenneth L. Hulsing
By Blackmore, Spencer & Flint
Attorneys

Patented Oct. 22, 1946

2,409,761

UNITED STATES PATENT OFFICE 2,409,761

SLEEVE VALVE ENGINE

Kenneth L. Hulsing, Plymouth, Mich., assignor to General Motors Corporation, Detroit, Mich., a corporation of Delaware Application February 24, 1945, Serial No. 579,607

11 Claims. (Cl. 123—65)

In two cycle sleeve valve engines it is desirable to delay the opening of the intake valves as long as possible in order to give ample time for the burned gases to escape, and, after scavenging, to hasten the closure of the intake valves in order to trap and compress as great a volume of gas as possible. This consideration necessarily requires a lessening of the part of the crankshaft rotation during which the valves are open for scavenging and recharging. In the patent to Kirtland and Hulsing for Sleeve valve engines, 2,362,700, dated November 14, 1944, that objective was quite satisfactorily attained by the use of a certain sleeve valve port arrangement associated with a special kind of sleeve valve reciprocating mechanism. In accordance with the present invention a modified sleeve valve port arrangement is associated with a simpler sleeve valve reciprocating arrangement. By this new arrangement the piston and sleeve valve cooperate to control the admission of gas or air supercharged, if desired, through the cylinder inlet port but the operation of the sleeve valve is much simpler and the change in the sleeve port arrangement provides a large opening through the sleeve for a short period so that scavenging and recharging are facilitated.

The invention will be explained by reference to the accompanying drawings, in which.

Figure 1:
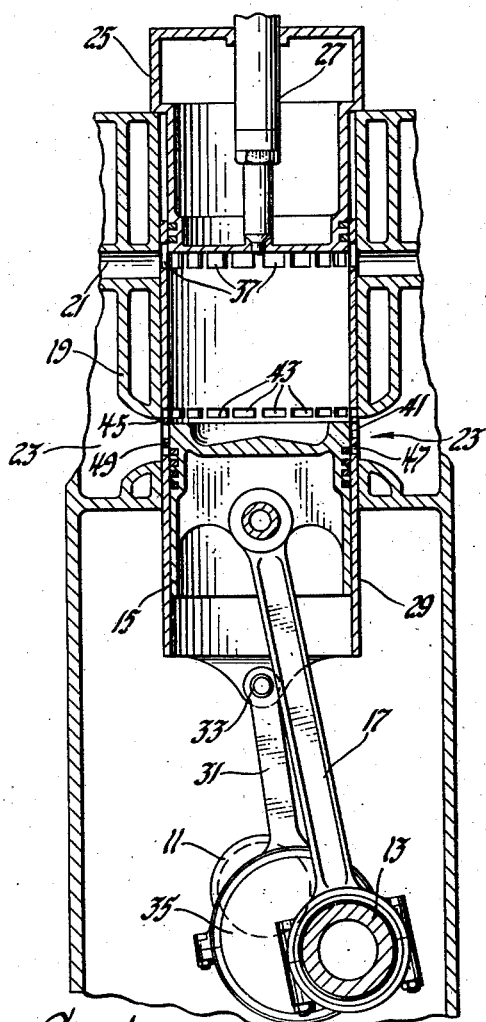
Fig. 1 is a vertical section through the cylinder, the sleeve valve and the piston.
Figure 2:
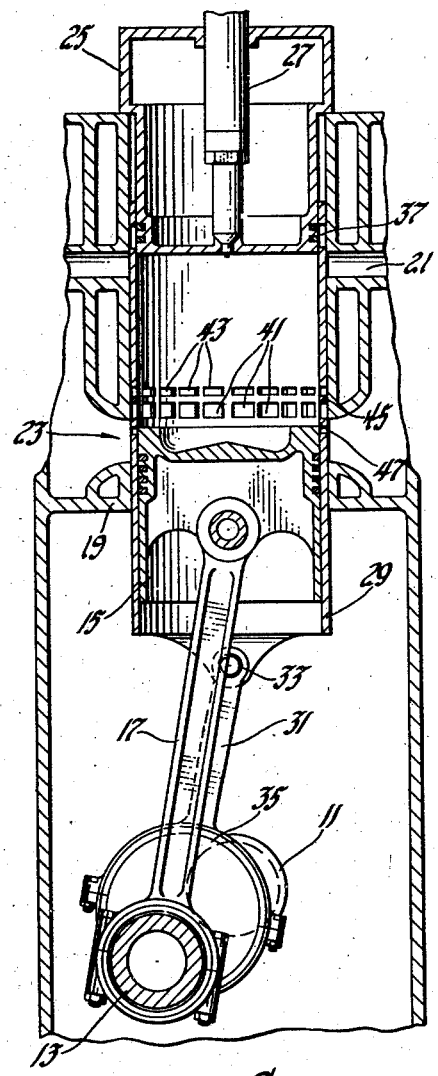
Fig. 2 is a similar view, the parts being shown in changed positions.

On the drawings, numeral 11 is used to mark the crankshaft. By means of a crankpin 13 its rotation reciprocates a piston 15 by the use of a conventional connecting rod 17. The piston reciprocates in a cylinder 19 having, near its upper end, a row of exhaust ports 21 and, adjacent its lower end, a row of inlet ports 23. Into the top of the cylinder is fitted a closure 25 carrying the conventional fuel injector 27. A sleeve valve 29 slides between the cylinder wall and the piston. The sleeve is reciprocated by connecting rods 31 connected to the sleeve at 33 and mounted on crankpins 35 one on either side of pin 13. Pins 35 are of lesser eccentricity from the axis of the crankshaft and are angularly displaced relative thereto. It will be seen, therefore, that the operative mechanism for the sleeve is much simpler than that of the above mentioned patent.

A row of exhaust valve ports 37 is formed in the sleeve. These register at times with the cylinder exhaust ports 21 to permit the discharge of burned gases in the usual way. From Fig. 4 and Fig. 5 it will be seen that the movement of the sleeve causes the exhaust port registration to begin at about 100° of crankshaft rotation from piston top dead center and that upon the return movement the exhaust opening is closed at about 227½° of crankshaft rotation.

To admit the incoming gas into the cylinder chamber through its intake ports there is a departure from the two parallel rows of sleeve openings of the patent referred to. I provide in the sleeve a primary row of openings marked 41, a second row of openings 43 above the openings 41 and separated therefrom by a land 45, and a third row of openings 47 below openings 41 and separated by a land 49.

Figure 3:
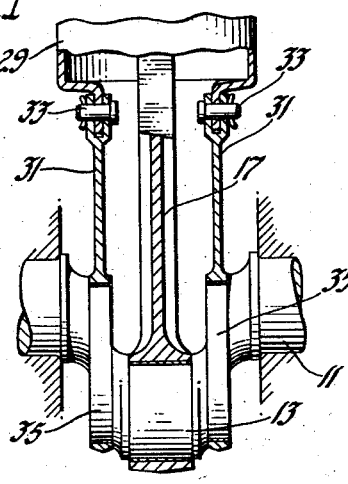
Fig. 3 is a detail, showing the crankshaft with the connecting rods for the piston and valve sleeve in section.
Figure 5:
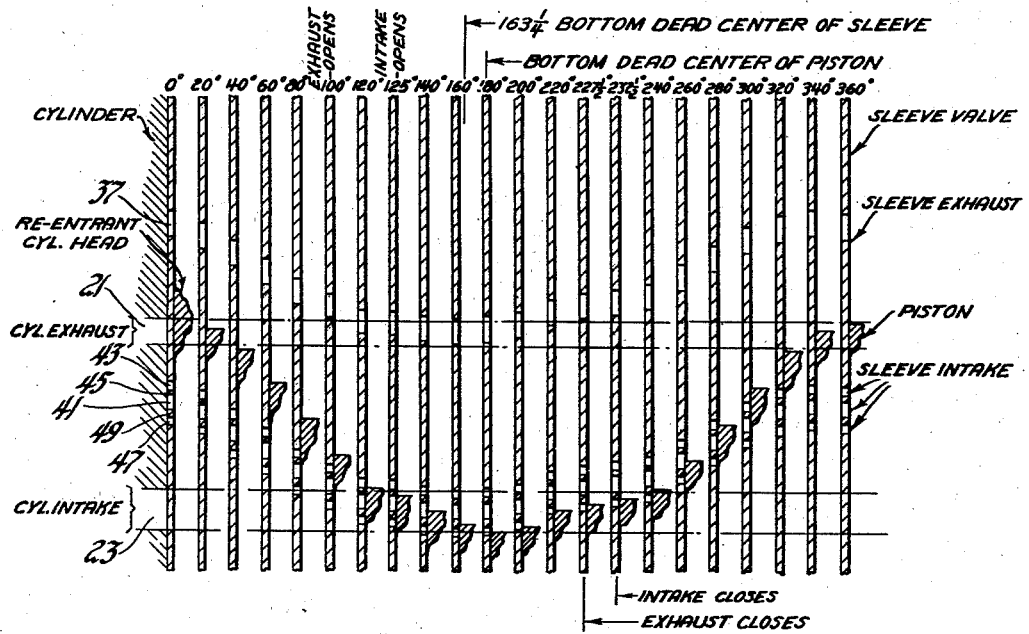
Fig. 5 is a diagram showing the relative positions of the moving sleeve and piston, and each relative to the cylinder ports corresponding to the several stages of crankshaft rotation.
Figure 4:
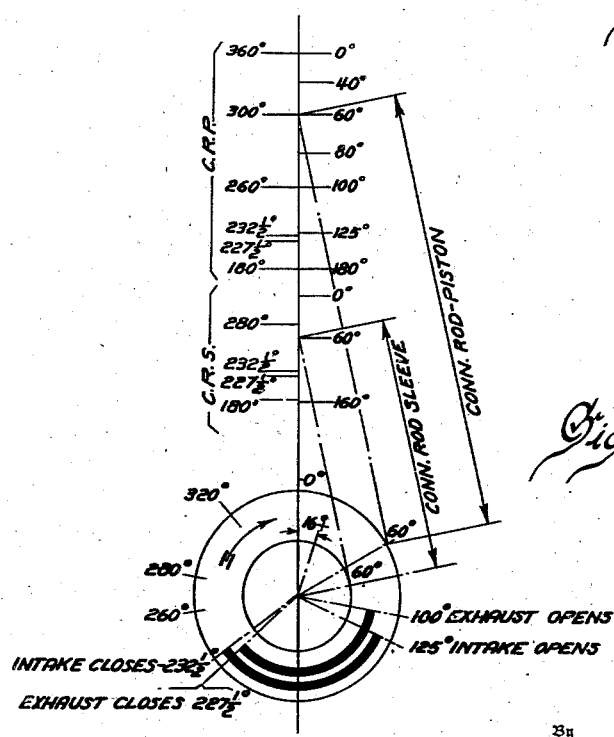
Fig. 4 is a diagram to show the valve timing in terms of crankshaft angles of rotation, piston upper dead center being marked 0°.

The sleeve crankpin 35 is substantially 16° ahead of the piston crankpin 13 as indicated on Fig. 4. The dimensions are so chosen and the sleeve ports so located that the registration of ports occurs as indicated by Fig. 5 to which reference is now made to explain the operation. The figures indicate the degrees of rotation from zero, assuming zero to be the position of top dead center of the piston. At about 100 degrees the sleeve exhaust port 37 is about to register with the cylinder exhaust port 21. At the same time inlet sleeve port 47 and a portion of port 41 register with cylinder inlet 23 but without effect because all three sleeve inlet ports are covered by the piston. At the 125° position the exhaust ports are nearly in registration. The piston has moved below the tip of cylinder inlet 23 and is about to render port 41 effective. However, the land 45 is supplementing the piston in keeping the passage 23 closed and only when the 125° position is passed is port 23 opened. It is then opened rapidly because the piston moves to render port 41 effective and the land moves to open the passage through 43. It will be seen that the sleeve inlet ports change but little relative to the cylinder inlet as the crankshaft turns from its 125° position to its 200° position. This is for the reason that the sleeve, being in advance of the piston in its cycle, goes through its lower dead center first. In this range ports 43 and 41 first open substantially simultaneously and as the piston passes through its bottom dead center, 180° on the diagram, it opens the lower sleeve port 47 partly because the piston is reaching its lowermost position and partly because the sleeve, being ahead of the piston, has begun its return movement. It will be seen that throughout this range, 125° to 200°, the exhaust port is almost wide open so that, coinciding with the large inlet opening, there is a free scavenging of burned gases and a free recharging of the cylinder with air from the supercharger, if one is used. Upon the return movement the land 45 reaches the top of cylinder port 23 at about 200° so that port 43 becomes ineffective. At 227½° the exhaust port closes completely and very shortly thereafter at 232½° the piston closes inlet port 47 and the land 49 closes the passage through port 41 so that the inlet is completely closed. After 232½° therefore the contents of the cylinder are trapped and compressed for the remainder of the compression stroke. If this diagram be compared with that of the patent referred to it will be seen that the results are substantially the same. It will be seen that the far simpler operative mechanism for the sleeve and piston is effective to get this delayed inlet port opening and accelerated closure because of the new port arrangement. The quick opening of ports 41 and 43 by resort to the land 45 is similar to that shown by Fig. 3 of the patent. However, the added opening 47 becomes effective adjacent piston lower dead center position and the land 49 enables the inlet 23 to close completely before being passed by the piston as seen in the diagram at 232½°. In other words, land 45 delays the inlet opening and land 49 accelerates the inlet closure while the port 47 gives an added area to the inlet opening in the region of piston lower dead center. It will therefore be understood that a relatively large inlet opening is provided. Also by the use of the lands associated with the piston the range through which the large opening is effective is reduced more than would be possible by merely controlling a continuous sleeve inlet port by piston movement.

I claim:

1. In an engine having a cylinder, a piston and a sleeve valve, means to reciprocate said piston and sleeve, said cylinder having inlet port means and said sleeve having an inlet port means divided by axially spaced lands, one of said lands operable jointly with the piston to delay registration of said port means and another of said lands operable jointly with said piston to accelerate the closure of the passage through the cylinder inlet port means.

2. In an internal combustion engine having a crankshaft, a cylinder, a piston, a sleeve valve between said cylinder and piston, means connected to said crankshaft to reciprocate said piston and said sleeve in out of phase relationship, said cylinder and sleeve having cooperating exhaust ports adapted to register, said cylinder having a circumferential row of inlet ports, said sleeve valve having a primary row of circumferentially arranged inlet ports and first and second secondary rows of circumferentially arranged inlet ports with lands between said primary row and each of said secondary rows, one of said lands operable jointly with the piston to delay the registration of the inlet ports and another of said lands operable jointly with the piston to cut off said inlet port registration before closure by the piston whereby large port registration may be secured during a small arc of crankshaft rotation.

3. The invention defined by claim 2, the ports of said primary row being longer than those of the secondary rows.

4. The invention defined by claim 2, said secondary rows of ports including a first row on one side of the primary row and a second row on the other side of the primary row, the movements of the piston and sleeve being such that the primary row registers with the cylinder port while still covered by the piston and the land between the primary row and said first secondary row moves to permit said first secondary row to register with the cylinder port as the piston uncovers the primary row in moving toward lower dead center and the land between the primary row and the said secondary row closes the passage to the cylinder from the cylinder inlet before the piston reaches a position opposite the end of the cylinder inlet as the piston moves from lower dead center.

5. In an internal combustion engine having a cylinder, a piston, a sleeve valve therebetween, a crankshaft having unequally eccentric and angular related throws, connecting rods between said throws and said piston and said sleeve respectively, exhaust ports in said cylinder wall and sleeve, said ports adapted to register in response to sleeve movement, intake port means in said cylinder wall, a primary intake port in said sleeve adapted to register with the cylinder inlet in response to movement of said sleeve, the relative movements of the sleeve and piston being such that only after the registration of the said inlet ports does piston move to uncover said primary sleeve inlet port, second port means in said sleeve adapted to register with the cylinder inlet substantially simultaneously with the opening of the primary port by the piston whereby an enlarged opening to inlet gases is provided, there being a land between said primary and second port means to delay the time of opening of said primary and second ports, third port means in said sleeve adapted to register with the cylinder inlet and to be rendered effective by the piston near its position of bottom dead center, there being a second land between said primary port and third port, said second land adapted to close the passage from the cylinder inlet before the piston moves sufficiently to close said passage.

6. The invention defined by claim 5, said primary port means being longer than said second and longer than said third port means.

7. The invention defined by claim 5, said second and said third port means being on opposite sides of said primary port means.

8. In an internal combustion engine having a cylinder with spaced inlet and exhaust port means, a piston reciprocable therein, a sleeve reciprocable between said piston and cylinder, means to reciprocate said piston and sleeve in out of phase relationship, said sleeve having exhaust port means to register with the cylinder exhaust port means, said sleeve having primary inlet ports adapted to register with the cylinder inlet port means, but to be rendered effective only by the movement of the piston over said primary ports, second inlet port means in said sleeve adapted to register with the cylinder inlet port means substantially simultaneously with the movement of the piston over the primary ports, a land between said primary and second port means to delay the opening of said second ports, third sleeve ports, a second land between said third ports and primary ports whereby said third ports may add to the area of admission adjacent lower dead center and whereby said last named second land may accelerate the time of closing the admission from the cylinder inlet.

9. In an internal combustion engine having a cylinder, a piston, a sleeve therebetween, means to reciprocate said sleeve and piston in out of phase relationship, exhaust ports in said cylinder and sleeve adapted to register, inlet port means in said cylinder, primary ports in said sleeve adapted first to register with said cylinder inlet port means and then to be rendered effective by the movement of the piston over said primary ports and other means in said sleeve operable to add to the area through which gas is admitted from the cylinder inlet port means, to retard the time of admission through said cylinder port means and to accelerate the time of closing of said passage.

10. In an internal combustion engine having a cylinder, a piston, a sleeve therebetween, means to reciprocate said sleeve and piston in out of phase relationship, exhaust ports in said cylinder and sleeve adapted to register, inlet port means in said cylinder, primary ports in said sleeve adapted first to register with said cylinder inlet port means and then to be rendered effective by the movement of the piston over said primary ports and other means in said sleeve operable to add to the area through which gas is admitted from the cylinder inlet port means, to retard the time of admission through said cylinder port means and to accelerate the time of closing of said passage, said other means including other ports in said sleeve on opposite sides of said primary ports and lands between said other ports and said primary ports.

11. In an internal combustion engine having a cylinder, a piston, a sleeve therebetween, means to reciprocate said sleeve and piston in out of phase relationship, exhaust ports in said cylinder and sleeve adapted to register, inlet port means in said cylinder, primary ports in said sleeve adapted first to register with said cylinder inlet port means and then to be rendered effective by the movement of the piston over said primary ports and other means in said sleeve operable to add to the area through which gas is admitted from the cylinder inlet port means, to retard the time of admission through said cylinder port means and to accelerate the time of closing of said passage, said other means including other ports in said sleeve on opposite sides of said primary ports and lands between said other ports and said primary ports, said other ports serving to add to the inlet area, the lands between primary ports and one of the other ports acting to retard the time of admission and the land between the primary port and another of said sleeve ports acting to accelerate the closure of the passage through the cylinder inlet port means.

KENNETH L. HULSING.